United States Patent
Hong et al.

(10) Patent No.: US 9,392,425 B2
(45) Date of Patent: Jul. 12, 2016

(54) METHOD AND APPARATUS FOR PROVIDING SHORT MESSAGE SERVICES FOR PACKET SWITCHING-ONLY SUBSCRIPTION IN MOBILE COMMUNICATIONS NETWORK

(71) Applicant: KT CORPORATION, Gyeonggi-do (KR)

(72) Inventors: Sung Pyo Hong, Seoul (KR); Woo Jin Choi, Seoul (KR); Hyun Pyo Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/383,605

(22) PCT Filed: Feb. 26, 2013

(86) PCT No.: PCT/KR2013/001510
§ 371 (c)(1),
(2) Date: Sep. 8, 2014

(87) PCT Pub. No.: WO2013/133564
PCT Pub. Date: Sep. 12, 2013

(65) Prior Publication Data
US 2015/0109966 A1    Apr. 23, 2015

(30) Foreign Application Priority Data

Mar. 9, 2012 (KR) .......... 10-2012-0024240
Sep. 6, 2012 (KR) .......... 10-2012-0098722

(51) Int. Cl.
*H04W 80/04* (2009.01)
*H04W 4/14* (2009.01)
*H04M 3/42* (2006.01)
*H04M 3/527* (2006.01)

(52) U.S. Cl.
CPC ............ *H04W 4/14* (2013.01); *H04M 3/42382* (2013.01); *H04M 3/527* (2013.01)

(58) Field of Classification Search
CPC ......... H04W 80/04; H04W 4/12; H04W 4/14; H04W 80/06
See application file for complete search history.

(56) References Cited

U.S. PATENT DOCUMENTS

| | | | |
|---|---|---|---|
| 8,032,164 B2 | 10/2011 | Aghili et al. | |
| 2002/0123360 A1* | 9/2002 | Vikman | H04Q 3/0029 455/466 |
| 2006/0019685 A1* | 1/2006 | Kornefalk | H04W 4/14 455/466 |
| 2006/0199567 A1* | 9/2006 | Alston | H04M 1/72552 455/412.1 |
| 2008/0125116 A1* | 5/2008 | Jiang | H04W 8/06 455/433 |

(Continued)

FOREIGN PATENT DOCUMENTS

| KR | 10-2011-0030605 A | 3/2011 |
|---|---|---|
| KR | 10-2011-0082526 A | 7/2011 |
| KR | 10-2011-0122029 A | 11/2011 |

*Primary Examiner* — Chiho Lee
(74) *Attorney, Agent, or Firm* — IP Legal Services, LLC

(57) ABSTRACT

The present disclosure relates to a method of a mobile management entity for providing SMS services for a packet switching-only subscription in an LTE mobile communication network. Particularly, the method may include transmitting a short message to a user equipment and transmitting, to a subscription information server, information indicating the user equipment is not reachable if the transmission of the short message fails.

13 Claims, 15 Drawing Sheets

(56) References Cited

U.S. PATENT DOCUMENTS

| | | | |
|---|---|---|---|
| 2009/0047967 A1* | 2/2009 | Zhu | H04L 12/5855 455/445 |
| 2009/0103520 A1* | 4/2009 | Begall | H04L 12/5875 370/352 |
| 2010/0233992 A1* | 9/2010 | Nooren | H04L 12/5855 455/404.1 |
| 2010/0261490 A1* | 10/2010 | Berry | H04W 4/12 455/466 |
| 2011/0085535 A1 | 4/2011 | Shaheen | |
| 2011/0165898 A1 | 7/2011 | Drevon et al. | |
| 2012/0094642 A1* | 4/2012 | Popperl | H04M 3/42076 455/415 |
| 2013/0095796 A1 | 4/2013 | Cho et al. | |

* cited by examiner

METHOD AND APPARATUS FOR PROVIDING SHORT MESSAGE SERVICES FOR PACKET SWITCHING-ONLY SUBSCRIPTION IN MOBILE COMMUNICATIONS NETWORK

CROSS REFERENCE TO RELATED APPLICATIONS

This application is a National Stage Patent Application of PCT International Patent Application No. PCT/KR2013/001510 (filed on Feb. 26, 2013) under 35 U.S.C. §371, which claims priority to Korean Patent Application Nos. 10-2012-0024240 (filed on Mar. 9, 2012) and 10-2012-0098722 (filed on Sep. 6, 2012), the teachings of which are incorporated herein in their entireties by reference.

TECHNICAL FIELD

The present invention relates to a method of providing an Short Message Service (SMS) service for a Packet Switching-only (PS only) subscription User Equipment (UE) in an Evolved Packet System (EPS), such as a Long Term Evolution (LTE) mobile communication network.

BACKGROUND ART

A mobile communication network includes a Radio Access Network (RAN) and a Core Network. A 3G mobile communication core network includes a Circuit Switched (CS) domain and a Packet Switched (PS) domain. An LTE mobile communication core network includes only a PS domain.

A PS-only subscription refers to a service subscription type that provides a user equipment (UE) with all of subscribed services (e.g., packet bearer service, SMS) only through a PS domain.

However, a typical SMS service method has drawbacks in an LTE mobile communication network. For example, an additional procedure is required, a CS service should be used, or a UE may fail to receive a part of information required for providing a service.

DETAILED DESCRIPTION OF THE INVENTION

Technical Problem

Therefore, the present invention has been made in view of the above-mentioned problems, and an aspect of the present invention is to enable a User Equipment (UE) to receive a response through EPS attach or to determine reception of the SMS service through an SMS in MME function, although the UE is registered on only Evolved Packet System (EPS) or is registered on a combined Evolved Packet System/International Mobile Subscriber Identity (EPS/IMSI), when a Packet Switching-only (PS only) subscription UE is provided with an SMS service through a Mobility Management Entity (MME) in an LTE mobile communication network. Another aspect of the present invention is to enable the MME to use an alerting procedure through the SMS in MME method, with respect to a PS-only UE that does not use a Mobile Station International Subscriber Directory Number (MSISDN).

Technical Solution

In accordance with an aspect of the present invention, there is provided a short message delivery method, executed by a Mobility Management Entity (MME) in a mobile communication network that provides a Packet Switching (PS)-only service, the method including: delivering a short message to a User Equipment (UE); and delivering, to a subscriber information server, information indicating that the UE is not reachable when the delivery of the short message to the UE fails.

In accordance with another aspect of the present invention, there is provided a short message delivery method, executed by a subscriber information server in a mobile communication network that provides a PS-only service, the method including: receiving, from an MME, information indicating that a UE to receive a short message is not reachable and receiving, from the MME, a preparation message for transmission of the short message; and delivering a service center alerting message to a short message server.

In accordance with another aspect of the present invention, there is provided an MME in a mobile communication network that provides a PS-only service, the MME including: a UE communication unit configured to deliver a short message to a UE; and a subscriber information server communication unit configured to deliver, to a subscriber information server, information indicating that the UE is not connectable when the delivery of the short message to the UE fails.

In accordance with another aspect of the present invention, there is provided a subscriber information server in a mobile communication network that provides a PS-only service, the subscriber information server including: an MME communication unit configured to receive, from the MME, a preparation message for transmission of a short message, after receiving, from the MME, information indicating that a UE that is to receive the short message is not connectable; and a message server communication unit configured to deliver a service center alerting message to a short message server.

Advantageous Effects

According to the present invention, when a PS-only subscription UE is provided with a SMS service through a MME in an LTE mobile communication network, the UE may determine the reception of the SMS service through a PS-only SMS function although the UE is registered on only an EPS or although the UE is registered on a combined EPS/IMSI. Thus, the PS-only UE may be efficiently provided with an SMS service. Furthermore, the MME may be enabled to use an alerting procedure through the SMS in MME method for a PS-only UE that does not use an MSISDN telephone number.

MODE FOR CARRYING OUT THE INVENTION

Figure 1:
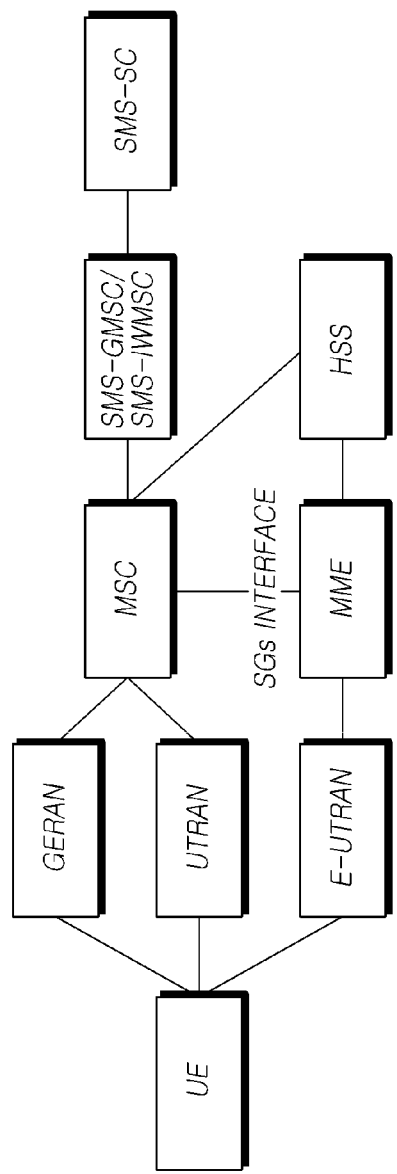
FIG. 1 is a diagram illustrating a structure of a communication network for providing an SMS service through an 'SMS over SGs'.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. If a component is described as "connected", "coupled", or "linked" to another component, one of ordinary skill in the art would understand the components are not necessarily directly "connected", "coupled", or "linked" but also are indirectly "connected", "coupled", or "linked" via a third component.

The present specification will be described from the perspective of LTE or LTE Advanced (LTE-A) communication. This is an embodiment of a Packet Switched (PS) domain, and the embodiments of the present invention may be applicable in the PS domain.

As described above, PS-only subscription refers to a type of service subscription that a UE is provided with all of services (e.g., a packet bearer service or an SMS) only through a PS domain.

To support the PS-only subscription in a 3G mobile communication network, a Home Subscriber Server (HSS) may provide two indications to a Serving GPRS Support Node (SGSN).

First, the HSS provides, to the SGSN, a 'PS-only-enforced' indication so that the SGSN does not set up a GS association between the SGSN and a Mobile Switching Center (MSC) server, and the SGSN does not execute IMSI attach with respect to a Circuit Switched (CS) domain. The 'PS-only-enforced' may be indicated to the SGSN by network access mode information of subscriber data when a subscriber profile does not include any CS subscriber data.

Also, the HSS may provide, to the SGSN, an 'PS-only-enabled' indication so that the SGSN executes PS-only service by taking into consideration an indication associated with communication capability provided by a UE, together. The 'PS-only-enabled' may be indicated, as 'SMS in SGSN support,' in subscriber data that the HSS provides to the SGSN when the subscriber data allows an SMS service and the SMS service through the SGSN is supported in a home network.

When a communication service provider provides a communication service associated with voice service or the like (e.g. CSFB, Circuit Switched fallback, SMS over SGs), using a CS domain of the 3G mobile communication network in the LTE mobile communication network (EPS, Evolved Packet System), the HSS may provide a Mobility Management Entity (MME) with the 'PS-only-enforced' indication (PS-only-enforced/Network Access Mode information of no CS) or 'PS-only-enabled' indication (PS-only-enabled/SMS in MME Support), so as to support the PS-only subscription that does not use the CS domain of the 3G mobile communication network.

Before providing the description of the present invention, each entity forming the present invention will be described as follows.

A User Equipment (UE) refers to a mobile communication terminal.

A GSM EDGE Radio Access Network (GERAN) refers to a 2G radio access network, and a Universal Terrestrial Radio Access Network (UTRAN) refers to a 3G radio access network. An Evolved UMTS Terrestrial Radio Access Network (E-UTRAN) refers to an LTE radio access network.

A Mobile Switching Center (MSC) refers to a CS-based mobile switching unit, and a Mobility Management Entity (MME) refers to an entity on a control plane for supporting a mobility management function in an Evolved Packet System (EPS).

A Gateway MSC for Short Message Service (SMS-GMSC) is an entity that receives a short message from a Short Message Service Center (SMSC), inquires of an HLR about routing information, and delivers a short message to an MSC that provides a service to a recipient UE.

An Interworking MSC for Short Message Service (SMS-IWMSC) refers to a switching device that receives a short message in a mobile communication network and delivers the same to an SMS-SC where the short message is to be processed.

A Short Message Service-Service Centre (SMS-SC) refers to an entity that relays, stores, and delivers a short message among entities (e.g., UE) that transmit and receive a short message. Generally, the SMS-SC server may be embodied as a single entity including the SMS-GMSC/SMS-IWMSC function.

A Home Subscriber Server (HSS) is a master database associated with a user, and an entity including subscriber related information required for supporting processing of a session in a network entity.

An IP-Short-Message-Gateway (IP-SM-GW) is an entity that executes a function for protocol interworking between an IP-based UE and an SMS-SC.

A Serving Call Session Control Function (S-CSCF) is a call/session control entity in an IMS.

In the LTE mobile communication network, an SMS service may be provided based on three methods.

FIG. 1 is a diagram illustrating a structure of a communication network for providing an SMS service through 'SMS over SGs'.

FIG. 1 illustrates a communication network for SMS over SGs that provides a SMS service through an SGs interface between an MME of an LTE mobile communication network and an MSC of a 3G mobile communication network. A short message delivery path of the 'SMS over SGs' is UE↔MME↔MSC↔SMS-GMSC/SMS-IWMSC↔SMSC.

In this method, the mobile communication terminal (UE) executes a combined EPS/IMSI network attach procedure (combined EPS/IMSI attach procedure) of 3GPP TS 23.272, so as to be provided with a CS fallback service and an SMS over SGs service. To this end, a attach type may be indicated, as 'combined EPS/IMSI,' in an attach request message. In this instance, when the UE requires an SMS service provided through only a SGs interface, without a CS fallback service, the UE needs to include an 'SMS-only' indication in the combined EPS/IMSI attach request. As described above, when the UE sends the combined EPS/IMSI attach request including the 'SMS-only' indication, and the 'SMS over SGs' is supported in a network, the network executes IMSI attach and the MME sets an indication indicating that the IMSI attach is for an SMS-only service, in a attach accept message.

The SMS service providing method using the SGs interface requires an MSC, which is a CS domain entity of the 3G mobile communication network, and the MME needs to execute IMSI attachment (IMSI attach) with the MSC.

Figure 2:
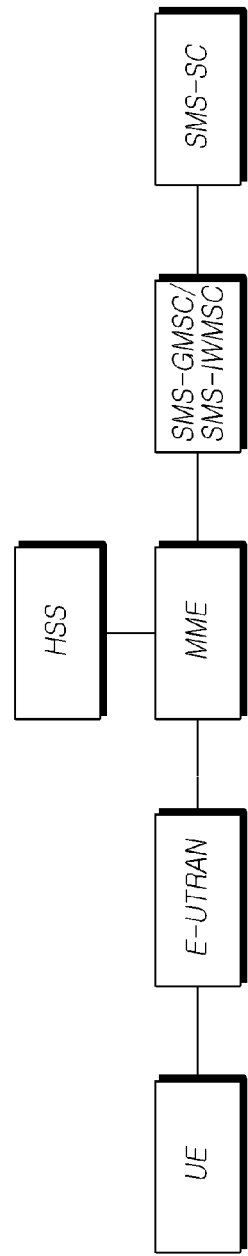
FIG. 2 is a diagram illustrating a structure of a communication network for providing an SMS service through an 'SMS in MME'.

FIG. 2 is a diagram illustrating a structure of a communication network for providing an SMS service through 'SMS in MME'.

FIG. 2 illustrates a communication network for a SMS in MME in which an MME provides an SMS service through a Short Message Control (SMC) function and a Short Message Relay (SMR) function, without an SGs association, in the LTE mobile communication network (e.g., Evolved Packet System (EPS)).

A delivery path of a short message based on the 'SMS in MME' method is UE↔MME↔SMS-GMSC/SMS-IWMSC↔ SMSC. The 'SMS in MME' method is a SMS service providing method mainly for a network that does not establish 2G/3G mobile communication radio access network (GERAN/UTRAN). An MME registers the MME supporting the SMS in MME function on an HSS as an MSC or a serving node for an incoming SMS service in order to directly interwork with an SMS-GMSC/SMS-IWMSC. Thus, the HSS uses the MME information as a serving node and provides a response to a routing information request (Send Routing Information) for the delivery of an incoming SMS in an SMS-SC or an SMS-GMSC.

From the perspective of the mobile communication terminal (e.g., UE), there is no difference between an SMS service provided through the SMS in MME method and an SMS service provided through the SMS over SGs method. That is, the UE registers a network on an MME through a combined EPS/IMSI attach procedure and an SMS may be transmitted and received between the UE and the MME through a Non Access Stratum (NAS) procedure. Further, when subscriber information data of the HSS indicates 'PS-only-enforced' (PS-only-enforced/Network Access Mode information of no CS) or when the subscriber information data of the HSS indicates 'PS-only-enabled'(PS-only-enabled/SMS in MME Support) and an SMS-only indication is received from the UE, the MME may not execute a attach procedure on an MSC/Visitor Location Register (VLR). Subsequently, however, the MME includes, in a network attach accept message, an indication indicating that IMSI attach is for an SMS-only service. The MME further includes, in the network attached accept message, a non-broadcasted Location Area Identity (LAI), which is not associated with the MSC/VLR. Then, the MME transmits the message. Accordingly, from the perspective of the UE, the SMS over SGs may be used, equivalently. However, this method has a complex mobility management procedure between the UE and the MME, and the UE may not distinguish the SMS over SGs method from the SMS in MME method.

Figure 3:
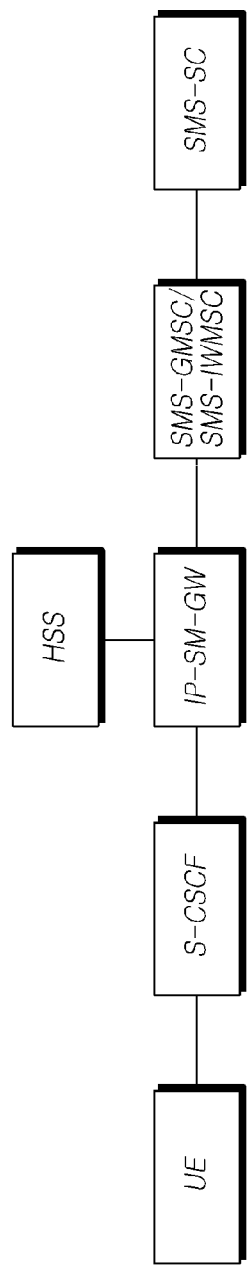
FIG. 3 is a diagram illustrating a structure of a communication network for providing an SMS service through an 'SMS over IP'.

FIG. 3 is a diagram illustrating a structure of a communication network for providing an SMS service through 'SMS over IP'.

FIG. 3 illustrates a communication network for SMS over IP that provides an SMS service based on an IP in an IP Multimedia Subsystem (IMS). To execute the method, a mobile communication terminal (e.g., UE) includes an IMS client function so as to execute an IMS attach procedure with a Serving-Call Session Control Function (S-CSCF) and the UE encapsulates a short message based on a Session Initiation Protocol (SIP) method for transmission. A delivery path of a short message of the SMS over IP method is as follows.

UE↔S-CSCF↔IP-SM-GW↔SMS-GMSC/SMS-IWMSC↔SMSC

The SMS service method in the LTE mobile communication network may have the following drawbacks. First, according to the SMS over IP method, a UE requires an IMS client function. Thus, the method has difficulty in providing an SMS service to a UE that does not include the IMS client function. The SMS over SG method uses an SGs interface between an MME and an MSC. Thus, there is a drawback in that a CS domain network entity of the 3G mobile communication network, such as, an MSC, is required.

The SMS in MME method has drawbacks. For example, a combined EPS/IMSI attach procedure, identical to that of the SMS over SGs, is required to be used with respect to a PS-only subscription UE. The PS-only subscription UE does not inform a network of whether it corresponds to a PS-only subscription UE. The UE does not determine that the UE is provided with the SMS service through the SMS in MME method. Further, unlike the SMS over SGs that supports an alerting procedure at an MSC, an MME does not support an alerting procedure in the SMS in MME method. Accordingly, when a UE is registered on a network again after the failure of the delivery of an incoming SMS to the UE, the delivery of an SMS may not be promptly processed. In particular, an alerting procedure of a typical MSC always uses an MSISDN. Thus, the method has difficulty in supporting the alerting procedure with respect to the PS-only subscription that does not use the MSISDN.

Hereinafter, in accordance with at least one embodiment of the present invention, a method may be provided for enabling a PS-only subscription UE to receive a response through EPS attach or to determine that it is provided with an SMS service through an SMS in MME function, although the UE executes only EPS attach or executes a combined EPS/IMSI attach. Further, in accordance with at least one embodiment of the present invention, a method may be provided for enabling an MME to use an alerting procedure with respect to a PS-only UE that does not use an MSISDN, through an SMS in MME method.

Figure 4:
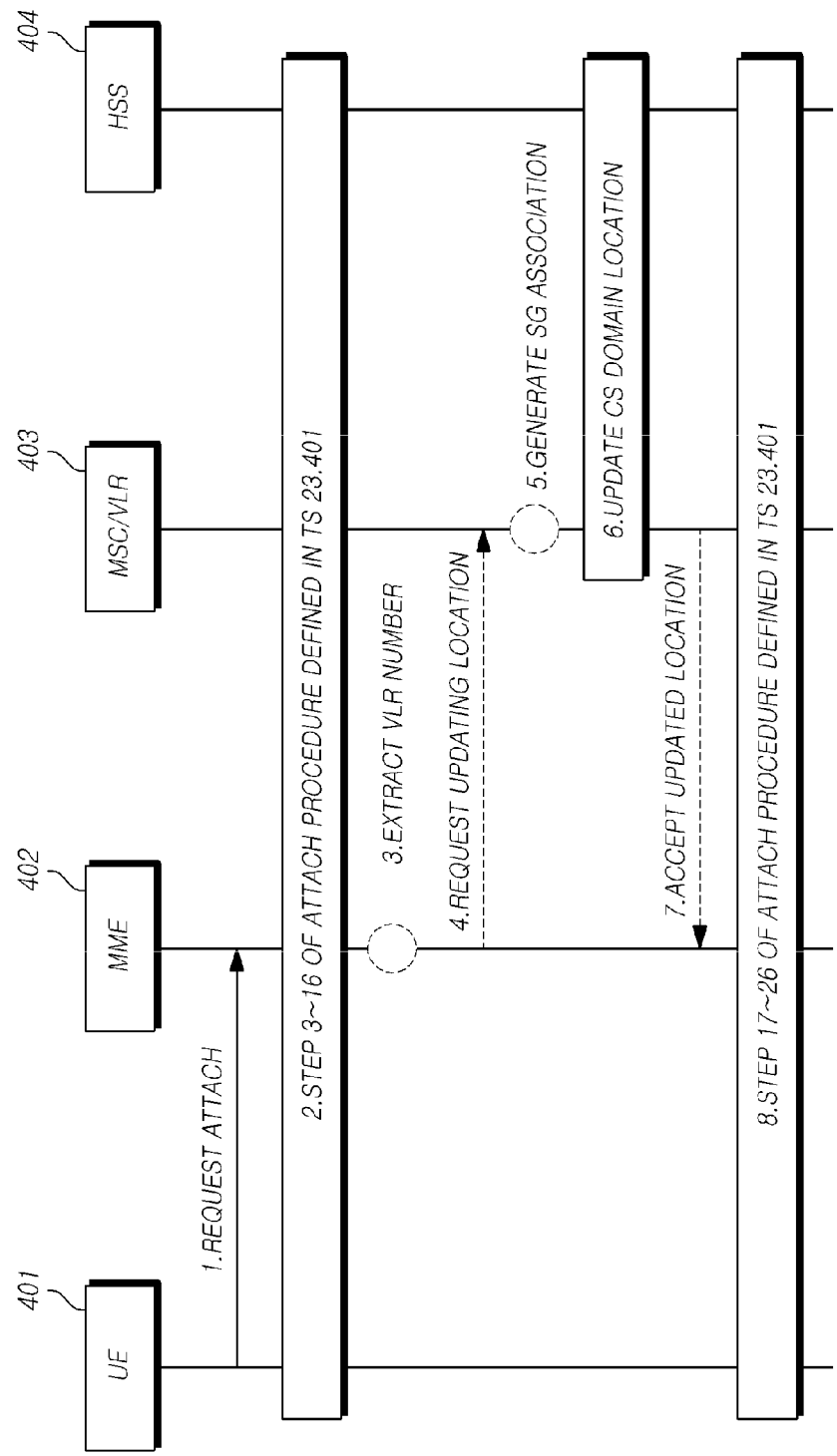
FIG. 4 illustrates a network attach procedure of a Packet Switching-only (PS-only) subscription User Equipment (UE) according to at least one embodiment of the present invention.

FIG. 4 illustrates a network attach procedure of a PS-only subscription UE according to at least one embodiment of the present invention.

1) A UE 401 initiates a network attach procedure by transmitting a attach request message to an MME 402. The attach request message includes attach type information and additional update type information.

By specifying the attach type as 'combined EPS/IMSI attach' and the additional update type as 'SMS-only', a UE may notify of that IMSI attach is for an SMS, that the UE does not desire any other services of a CS domain, or that the UE is for a PS-only subscription. That is, when the UE corresponds to a PS-only subscription, an SMS-only indication may be included in a combined EPS/IMSI attach request message.

Alternatively, by specifying the attach type as 'EPS attach' and the additional update type as 'SMS-only,' a UE may notify that a UE is for a PS-only subscription. That is, when the UE corresponds to a PS-only subscription, an SMS-only indication may be included in an EPS attach request message.

Alternatively, by specifying the attach type as 'combined EPS/IMSI attach' and the additional update type as 'SMS-only,' and by including new information (information element) to indicate a PS-only subscription, a UE may notify that a UE is for a PS-only subscription. That is, when the UE corresponds to the PS-only subscription, an SMS-only indication and a PS-only indication may be included in a combined EPS/IMSI attach request message.

Alternatively, by specifying the attach type as 'EPS attach' and by including new information (Information Element) to indicate a PS-only subscription, a UE may notify that that a UE is for a PS-only subscription. That is, when the UE corresponds to the PS-only subscription, a PS-only indication may be included in an EPS attach request message.

2) The UE 401, the MME 402, an MSC/VLR 403, and an HSS 404 execute a procedure from step 3 through step 16 of an EPS network attach procedure (EPS attach procedure) specified in 3GPP TS 23.401.

In this example, when a UE sends a request including an SMS-only indication and when an MME is configured (or enabled) to use 'SMS in MME,' the MME notifies the HSS of the 'SMS in MME' function supported, so as to register the MME as a serving node for an incoming SMS service. When subscriber data indicates that an SMS service is allowed and 'SMS in MME (SMS in MME Support) is supported,' the HSS sets an indication of 'SMS in MME support' on the subscriber data that is provided to the MME. The MME determines 'SMS in MME' as an SMS service delivery method for a UE. That is, when the UE is indicated as SMS-only, when subscriber data indicates that an SMS service is allowed, and when the HSS notifies the MME of 'SMS in MME support, the MME may determine 'SMS in MME' to be provided as an SMS service delivery method for the UE.

Alternatively, when the UE sends a request including PS-only and the MME is configured to use 'SMS in MME,' the MME notifies the HSS of the 'SMS in MME' function supported.

Alternatively, when the UE sends a request including SMS-only and PS-only and the MME is configured to use 'SMS in MME,' the MME notifies the HSS of the 'SMS in MME' function supported.

3) When the attach type of the attach request message is specified as combined EPS/IMSI attach, the MME 402 supporting the 'SMS in MME' function may allocate non-broadcasted LAI for the UE.

4-7) the MME 402 transmits a location update request message to the MSC/VLR 403, the MSC/VLR 403 generates an SG association, the MSC/VLR 403 and the HSS 404 update a CD domain location, and the MSC/VLR 403 transmits a location update accept message to the MME 402.

When an MME supports the 'SMS in MME' function with respect to an UE that requests SMS-only or when subscriber information data of the HSS indicates 'PS-only enforced' (PS-only-enforced/Network Access Mode Information of No CS) or subscriber information data indicates 'PS-only-enabled' (PS-only-enabled/SMS in MME Support) and when the MME receives an SMS-only indication, steps 4-7 (location update) may be omitted. That is, when the MME determines 'SMS in MME' as an SMS service delivery method for the UE, after receiving the SMS-only indication from the UE, steps 4-7 may be omitted.

Alternatively, when the MME supports the 'SMS in MME' function with respect to a UE that requests PS-only or when the subscriber information data of the HSS indicates 'PS-only-enforced' (PS-only-enforced/Network Access Mode information of no CS) or the subscriber information data indicates 'PS-only-enabled' (PS-only-enabled/SMS in MME Support and when the MME receives a PS-only indication from the UE, steps 4-7 may be omitted.

Alternatively, when the MME supports the 'SMS in MME' function with respect to a UE that sends a request including SMS-only and PS-only or when the subscriber information data of the HSS indicates 'PS-only-enforced' (PS-only-enforced/Network Access Mode information of no CS) or indicates 'PS-only-enabled' (PS-only-enabled/SMS in MME Support) and when the MME receives an SMS-only and PS-only indication from the UE, steps 4-7 are omitted.

8) The UE 401, the MME 402, the MSC/VLR 403, and the HSS 404 execute a procedure from step 17 through step 26 of an EPS network attach procedure (EPS attach procedure) specified in 3GPP TS 23.401 and terminate the EPS network attach procedure.

In this example, when the MME supports the 'SMS in MME' function, when the subscriber information data indicates 'PS-only-enforced' (PS-only-enforced/Network Access Mode information of no CS) or the subscriber information data indicates 'PS-only-enabled' (PS-only-enabled/SMS in MME Support), and when the MME receives an SMS-only indication from the UE, the MME sets an indication of 'EPS attach' (EPS only) as a attach result in a attach accept message and includes, in the message, the SMS-only indication, so as to notify that the MME supports the 'SMS in MME' function. When the UE receives an EPS attach indication and an SMS-only indication, indicating a PS-only subscription, from the MME, the UE executes a network attach procedure using the EPS attach as the attach type.

Alternatively, when the MME supports 'SMS in MME,' when subscriber information data indicates 'PS-only-enforced' (PS-only-enforced/Network Access Mode information of no CS) or the subscriber information data indicates 'PS-only-enabled'(PS-only-enabled/SMS in MME Support), and when the MME receives an SMS-only indication from the UE, the MME include, in a attach accept message, new information (Information element) notifying that the 'SMS in MME' function is supported.

Alternatively, when the MME supports the 'SMS in MME' function, when the subscriber information data indicates 'PS-only-enforced' (PS-only-enforced/Network Access Mode information of no CS) or the subscriber information data indicates 'PS-only-enabled' (PS-only-enabled/SMS in MME Support), and when the MME receives an PS-only indication from the UE, the MME sets an indication of 'EPS attach' (EPS only) in a attach accept message as a attach result and includes, in the message, the PS-only indication, so as to indicate that the MME supports the 'SMS in MME' function. When the UE receives an EPS attach indication and a PS-only indication, indicating the PS-only subscription, from the MME, the UE executes a network attach procedure using the EPS attach as the attach type.

Alternatively, when the MME supports the 'SMS in MME' function, when the subscriber information data indicates 'PS-only-enforced' (PS-only-enforced/Network Access Mode information of no CS) or the subscriber information data indicates 'PS-only-enabled' (PS-only-enabled/SMS in MME Support), and when the MME receives an SMS-only indication and a PS-only indication from the UE, the MME sets an indication of 'EPS attach' (EPS only) in a attach accept message as a attach result and includes, in the message, the SMS-only indication and the PS-only indication, so as to indicate that the MME supports the 'SMS in MME' function. When the UE receives, from the MME, an EPS attach indication, an SMS-only indication, and a PS-only indication indicating a PS-only subscription, the UE may execute a network attach procedure using the EPS attach as the attach type.

Alternatively, when the MME supports the 'SMS in MME' function, when the subscriber information data indicates 'PS-only-enforced' (PS-only-enforced/Network Access Mode information of no CS) or the subscriber information data indicates 'PS-only-enabled' (PS-only-enabled/SMS in MME Support), and when the MME receives an SMS-only indication from the UE, the MME sets an indication of 'combined EPS/IMSI attach' (combined EPS/IMSI) in a attach accept message as a attach result and includes, in the message, the SMS-only indication, so as to indicate that the MME supports the 'SMS in MME' function.

Hereinafter, another embodiment associated with FIG. 4 will be described.

1) The UE 401 transmits a attach request message to the MME 402 so as to initiate a network attach procedure. The attach request message includes attach type information and additional update type information.

By specifying the attach type as 'combined EPS/IMSI attach' and the additional update type as 'SMS-only,' a UE may indicate that an IMSI attach is for an SMS and the UE does not desire any other services of a CS domain, or the UE is for a PS-only subscription. That is, when the UE corresponds to a PS-only subscription, an SMS-only indication may be included in a combined EPS/IMSI attach request message.

2) The UE 401, the MME 402, the MSC/VLR 403, and the HSS 404 execute a procedure from step 3 through step 16 of an EPS network attach procedure (EPS attach procedure) specified in 3GPP TS 23.401.

In this instance, when the UE sends a request including SMS-only and the MME is configured to use 'SMS in MME,' the MME indicates to the HSS that the 'SMS in MME' function is supported.

3) When the attach type of the attach request message is specified as combined EPS/IMSI attach, the MME 402 that supports the 'SMS in MME' function may allocate non-broadcasted LAI for the UE.

4-7) The MME 402 transmits a location update request message to the MSC/VLR 403, the MSC/VLR 403 generates an SG association, the MSC/VLR 403 and the HSS 404 update a location of a CD domain, and the MSC/VLR 403 transmits a location update accept message to the MME 402.

When the MME supports the 'SMS in MME' function with respect to an UE that requests SMS-only, when subscriber information data of the HSS indicates 'PS-only enforced' (PS-only-enforced/Network Access Mode Information of No CS) or subscriber information data indicates 'PS-only-enabled' (PS-only-enabled/SMS in MME Support), and when the MME receives an SMS-only indication from the UE, steps 4-7 may be omitted.

8) The UE 401, the MME 402, the MSC/VLR 403, and the HSS 404 execute a procedure from step 17 through step 26 of an EPS network attach procedure (EPS attach procedure) specified in 3GPP TS 23.401, and terminates the EPS network attach procedure.

In this instance, when the MME supports the 'SMS in MME' function, when the subscriber information data indicates 'PS-only-enforced' (PS-only-enforced/Network Access Mode information of no CS) or the subscriber information data indicates 'PS-only-enabled' (PS-only-enabled/SMS in MME Support), and when the MME receives an SMS-only indication from the UE, the MME sets an indication of 'EPS attach' (EPS only) in a attach accept message as a attach result, and includes, in the message, an SMS-only indication, so as to indicate that the MME supports the 'SMS in MME' function.

When the UE receives an EPS attach indication and an SMS-only indication, indicating a PS-only subscription, from the MME, the UE executes a network attach procedure using the EPS attach as the attach type.

Hereinafter, another embodiment associated with FIG. 4 will be described.

1) The UE 401 transmits an attach request message to the MME 402 to initiate a network attach procedure. The attach request message includes attach type information and additional update type information.

By specifying the attach type as 'EPS attach' and the additional update type as 'SMS-only' (SMS-only), the UE may be indicated as for a PS-only subscription. That is, when the UE corresponds to a PS-only subscription, the SMS-only indication may be included in an EPS attach request message.

2) The UE 401, the MME 402, the MSC/VLR 403, and the HSS 404 execute a procedure from step 3 through step 16 of an EPS network attach procedure (EPS attach procedure) specified in 3GPP TS 23.401.

In this instance, when the UE sends a request including SMS-only and the MME is configured to use 'SMS in MME,' the MME indicates to notify the HSS that the 'SMS in MME' function is supported.

3-7) steps 3-7 are omitted.

8) The UE 401, the MME 402, the MSC/VLR 403, and the HSS 404 execute a procedure from step 17 through step 26 of an EPS network attach procedure (EPS attach procedure), specified in 3GPP TS 23.401, and terminates the EPS network attach procedure.

In this instance, when the MME supports the 'SMS in MME' function, when the subscriber information data indicates 'PS-only-enforced' (PS-only-enforced/Network Access Mode information of no CS) or the subscriber information data indicates 'PS-only-enabled' (PS-only-enabled/SMS in MME Support), and when the MME receives an SMS-only indication from the UE, the MME sets an indication of 'EPS attach' (EPS only) in a attach accept message and includes, in the message, an SMS-only indication, so as to notify that the MME supports the 'SMS in MME' function.

Figure 5:
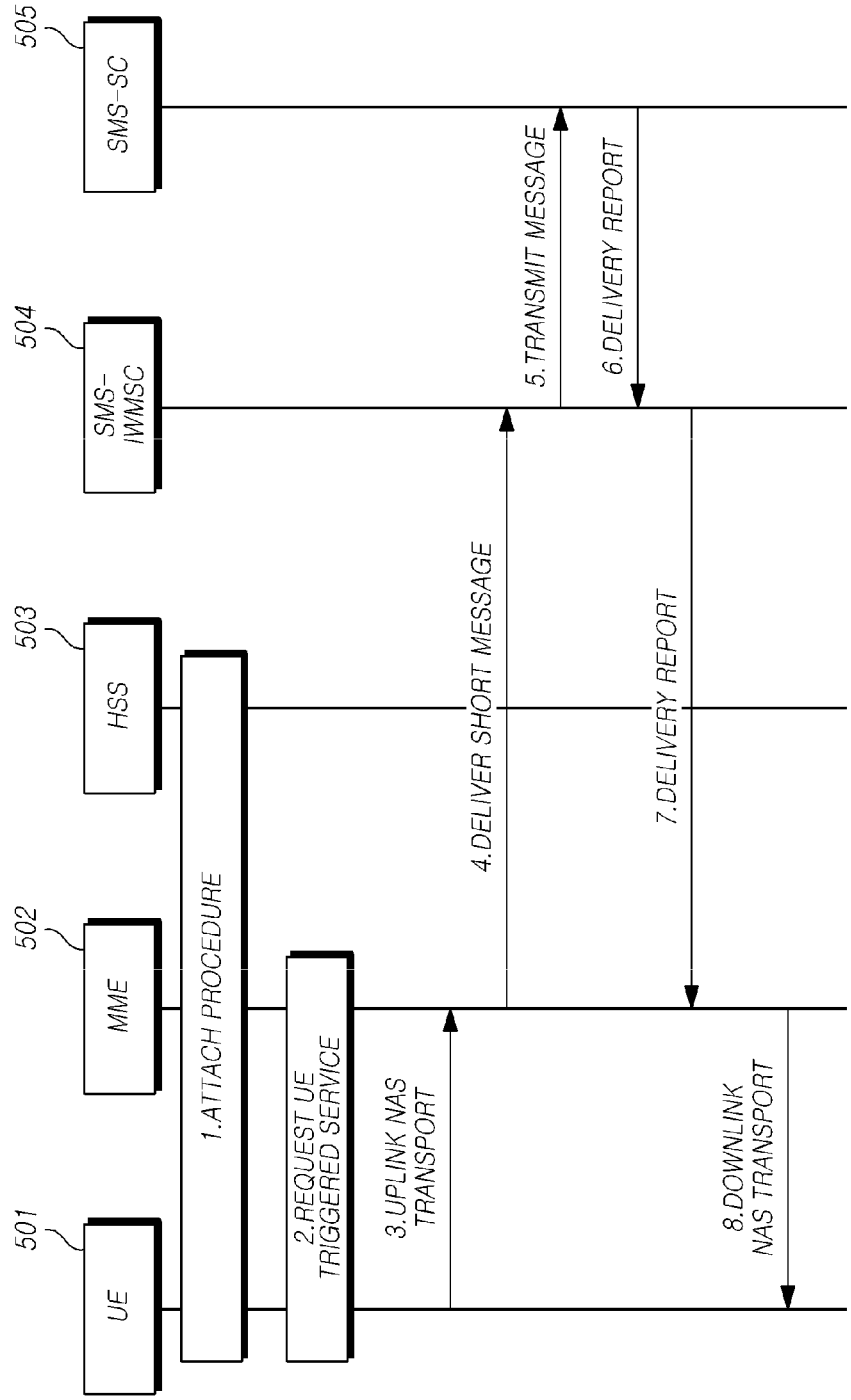
FIG. 5 is a flowchart illustrating delivery of a Mobile Originating (MO) SMS service with respect to a PS-only UE in an idle mode according to at least one embodiment of the present invention.

FIG. 5 is a flowchart illustrating delivery of Mobile Originating (MO) SMS service with respect to a PS-only subscription UE in an idle mode according to the present invention. FIG. 5 uses an SMS-IWMSC 504.

1) A network attach procedure described in FIG. 4 is performed. Alternatively, a combined EPS/IMSI network attach procedure to which an SMS in MME function is applicable is performed.

2) When an MO SMS is triggered after a UE 501 enters into an idle mode, the UE 501 initiates a UE triggered service request procedure described in 3GPP TS 23.401. An MME 502 may send, to the UE 501, an acknowledgment associated with reception of an SMS.

3) The UE 501 generates an SMS message (i.e., CP-DATA/RP-DATA/TPDU/SMS-SUBMIT), defined in 3GPP TS 23.040, activates a radio bearer, encapsulates the SMS message into an NAS message, and transmits the same to the MME 502.

4) The MME 502 forwards a short message to the SMS-IWMSC 504. Hereinafter, the delivery of a short message and the return of a delivery report of steps 4-7 are defined in TS 23.040.

In this instance, when a PS-only subscription UE uses an external identifier, as opposed to an MSISDN, the MME delivers the short message to an RP-Originating-Address (RP-OA) of Relay Layer Protocol-Mobile Originate (RP-MO-DATA), using an IMSI. Alternatively, the MME delivers the short message to an RP-Originating-Address (RP-OA) of Relay Layer Protocol-Mobile Originate (RP-MO-DATA), using an external identifier. Alternatively, the MME delivers the short message to an RP-Originating-Address (RP-OA) of Relay Layer Protocol-Mobile Originate (RP-MO-DATA), using only a local identifier out of the external identifier. The external identifier is classified into a domain identifier under a control of a Mobile Network Operator (MNO) and a local identifier allocated by the MNO, and the local identifier may be used for obtaining an IMSI.

5) The SMS-IWMSC 504 delivers a short message to an SMS-SC 505.

In this instance, when a PS-only subscription UE uses an external identifier, as opposed to an MSISDN, the SMS-IWMSC delivers the short message to an RP-Originating-Address (RP-OA) of Relay Layer Protocol-Mobile Originate (RP-MO-DATA), using an IMSI. Alternatively, the MME delivers the short message to an RP-Originating-Address (RP-OA) of Relay Layer Protocol-Mobile Originate (RP-MO-DATA), using an external identifier. Alternatively, the MME delivers the short message to an RP-Originating-Address (RP-OA) of Relay Layer Protocol-Mobile Originate (RP-MO-DATA), using only a local identifier out of the external identifier. The external identifier is classified into a domain identifier under a control of a Mobile Network Operator (MNO) and a local identifier allocated by the MNO, and the local identifier may be used for obtaining an IMSI.

6-7) The SMS-SC 505 returns a delivery report. That is, the delivery report is transferred to the MME 502 through the SMS-IWMSC 504.

8) The MME 502 encapsulates the delivery report into an NAS message and transmits the same to the UE 501. The UE sends an acknowledgement to the MME with respect to the reception of the delivery report.

Figure 6:
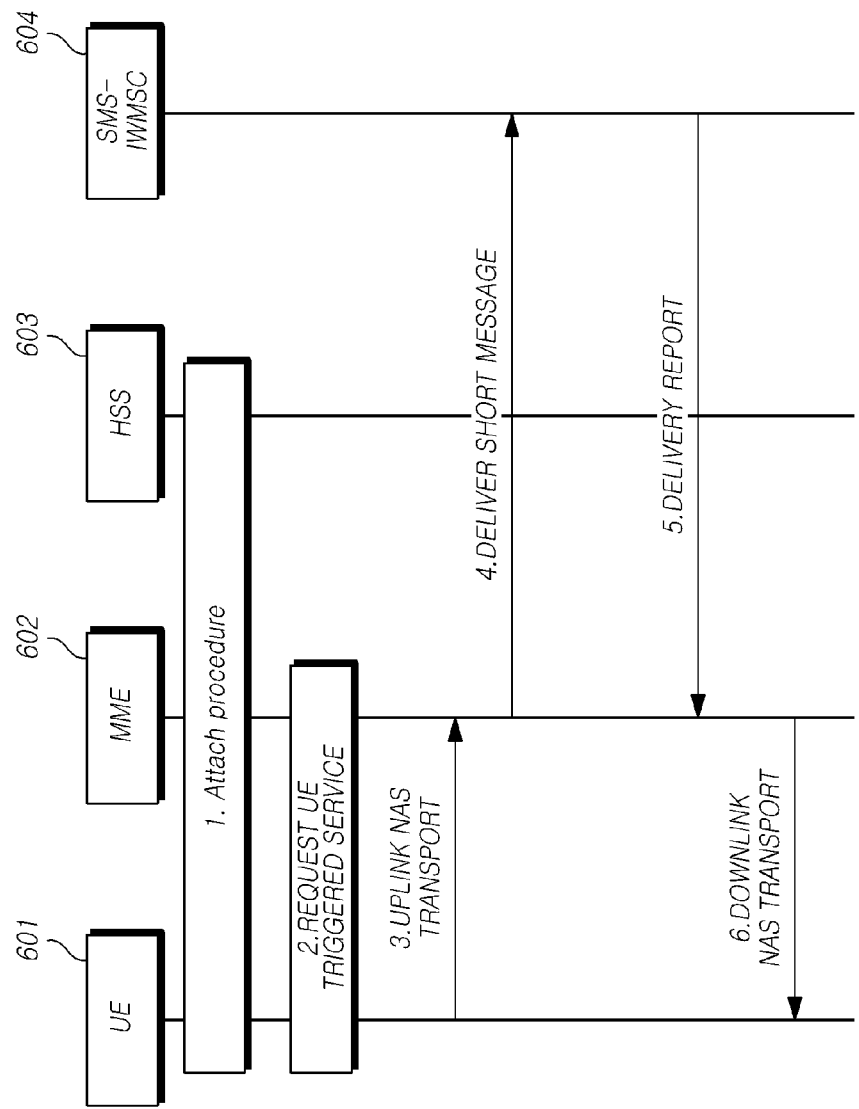
FIG. 6 is a flowchart illustrating delivery of a MO SMS service with respect to a PS-only UE in an idle mode according to at least one embodiment of the present invention.

FIG. 6 is a flowchart illustrating delivery of Mobile Originating (MO) SMS service with respect to a PS-only subscription UE in an idle mode according to at least one of the present invention. FIG. 6 illustrates the case in which an MME and an SMS-SC are directly connected (that is, the case in which an SMS-IWMSC function is embodied in an SMS-SC).

1) A network attach procedure described in FIG. 4 is performed. Alternatively, a combined EPS/IMSI network attach procedure to which an SMS in MME function is applicable is performed.

2) When an MO SMS is triggered after a UE 601 enters into an idle mode, the UE 601 initiates a UE triggered service request procedure described in 3GPP TS 23.401.

3) The UE 601 generates an SMS message (i.e., RP-DATA/TPDU/SMS-SUBMIT), defined in 3GPP TS 23.040, activates a radio bearer, encapsulates the SMS message into an NAS message, and transmits the same to the MME 502.

4) The MME 602 delivers a short message to an SMS-SC 605.

In this instance, when a PS-only subscription UE uses an external identifier, as opposed to an MSISDN, the MME delivers the short message to an RP-Originating-Address (RP-OA) of Relay Layer Protocol-Mobile Originate (RP-MO-DATA), using an IMSI. Alternatively, the MME delivers the short message to an RP-Originating-Address (RP-OA) of Relay Layer Protocol-Mobile Originate (RP-MO-DATA), using an external identifier. Alternatively, the MME delivers the short message to an RP-Originating-Address (RP-OA) of Relay Layer Protocol-Mobile Originate (RP-MO-DATA), using only a local identifier out of the external identifier. The external identifier is classified into a domain identifier under a control of a Mobile Network Operator (MNO) and a local identifier allocated by the MNO, and the local identifier may be used for obtaining an IMSI.

5) The SMS-SC 605 returns a delivery report to the MME 602.

6) The MME 602 encapsulates the delivery report into an NAS message and transmits the same to the UE 601.

Figure 7:
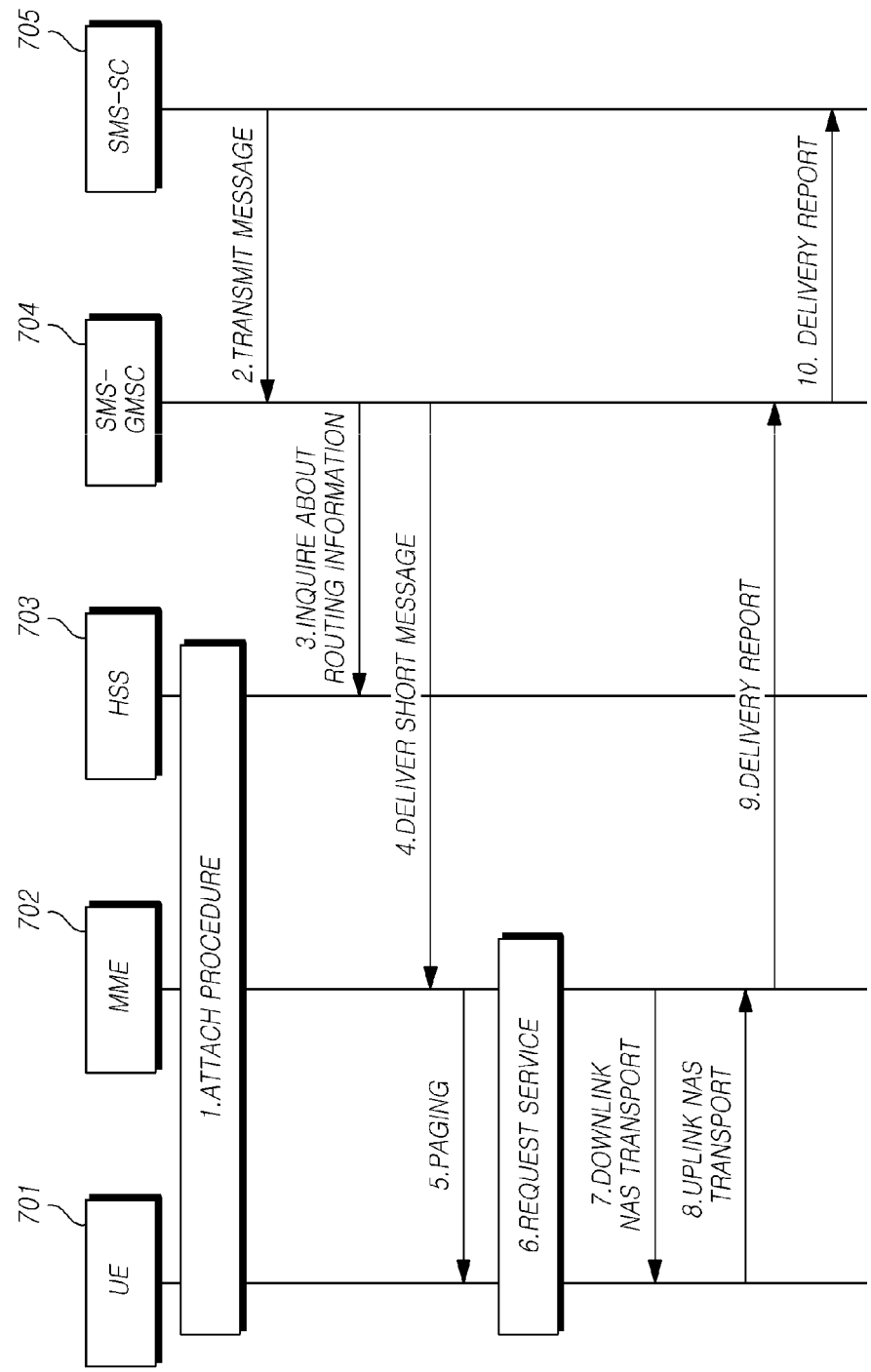
FIG. 7 is a flowchart illustrating delivery of a Mobile Terminating (MT) SMS service with respect to a PS-only subscription UE in an idle mode according to at least one embodiment of the present invention.

FIG. 7 is a flow diagram illustrating delivery of a Mobile Terminating (MT) SMS service with respect to a PS-only subscription UE in an idle mode according to another embodiment of the present invention. FIG. 7 uses an SMS-GMSC 704.

1) A network attach procedure described in FIG. 4 is executed. Alternatively, a combined EPS/IMSI network attach procedure to which an SMS in MME function is applicable is executed.

2) A SMS-SC 705 delivers an SMS message (i.e. RP-DATA/TPDU/SMS-DELIVERY) to the SMS-GMSC 704. In case that the SMS-SC receives MME information and is aware of an MME that is providing a service to an UE, the SMS-SC may deliver the information together with the SMS message to the SMS-GMSC.

In this instance, when a UE that receives the SMS uses an external identifier, as opposed to an MSISDN, the SMS-SC delivers the SMS message to an RP-Destination-Address (RP-DA) of Relay Layer Protocol-Mobile terminate (RP-MT-DATA), using an IMSI. Alternatively, the SMC-SC delivers the SMS message to an RP-Destination-Address (RP-DA) of Relay Layer Protocol-Mobile terminate (RP-MT-DATA), using an external identifier. Alternatively, the SMC-SC delivers the SMS message to an RP-Destination-Address (RP-DA) of Relay Layer Protocol-Mobile terminate (RP-MT-DATA), using only a local identifier out of an external identifier. The external identifier is classified into a domain identifier under a control of a Mobile Network Operator (MNO) and a local identifier allocated by the MNO, and the local identifier is used for obtaining an IMSI.

3) The SMS-GSMC 704 inquires of an HSS (or an HLR) 703 about MME information that is providing a service to a UE. In this instance, when the SMS-GMSC receives the MME information from the SMS-SC, the SMS-GMSC may omit step 3.

4) The SMS-GSMC 704 delivers a short message to an MME 702.

In this instance, when a UE that receives the SMS uses an external identifier, as opposed to an MSISDN, the SMS-GMSC delivers the short message to an RP-Destination-Address (RP-DA) of Relay Layer Protocol-Mobile terminate (RP-MT-DATA), using an IMSI. Alternatively, the SMC- GMSC delivers the short message to an RP-Destination-Address (RP-DA) of Relay Layer Protocol-Mobile terminate (RP-MT-DATA), using an external identifier. Alternatively, the SMS-GMSC delivers the short message to an RP-Destination-Address (RP-DA) of Relay Layer Protocol-Mobile terminate data (RP-MT-DATA), using only a local identifier out of the external identifier. The external identifier is classified into a domain identifier under a control of a Mobile Network Operator (MNO) and a local identifier allocated by the MNO, and the local identifier may be used for obtaining an IMSI.

5) The MME 702 initiates a paging procedure.

6) The UE 701 transmits a service request message to the MME 702.

7) The MME 702 encapsulates the SMS message into an NAS message and transmits the same to the UE 701. The UE may send an acknowledgment with respect to reception of the SMS to the MME.

8) The UE 701 delivers a delivery report to the MME 702.

9-10) The MME 702 returns the delivery report to the SMS-SC 705 through the SMS-GMSC 704. A general procedure of returning a delivery report is defined in TS23.040. When a message delivery fails and the SMS-GMSC receives a failure report associated with a short message delivery, the SMS-GMSC transfers a message to the HSS to update a Message Waiting Indication (MWI) indicating that a waiting message exists. The message waiting indication (MWI) includes a Message Waiting Data (MWD) and UE Not Reachable for MME (UNRE) or Mobile Station Not Reachable Flag (MNRF), which indicate a UE is not reachable from a MME. The MWD includes a list of SMS-SC addresses for which a message delivery has failed and MSISDN-Alert used by the HSS for reporting to the SMS-SC that a UE becomes connectable again.

The MME sends, to the UE, an acknowledgement associated with reception of a deliver report.

Figure 8:
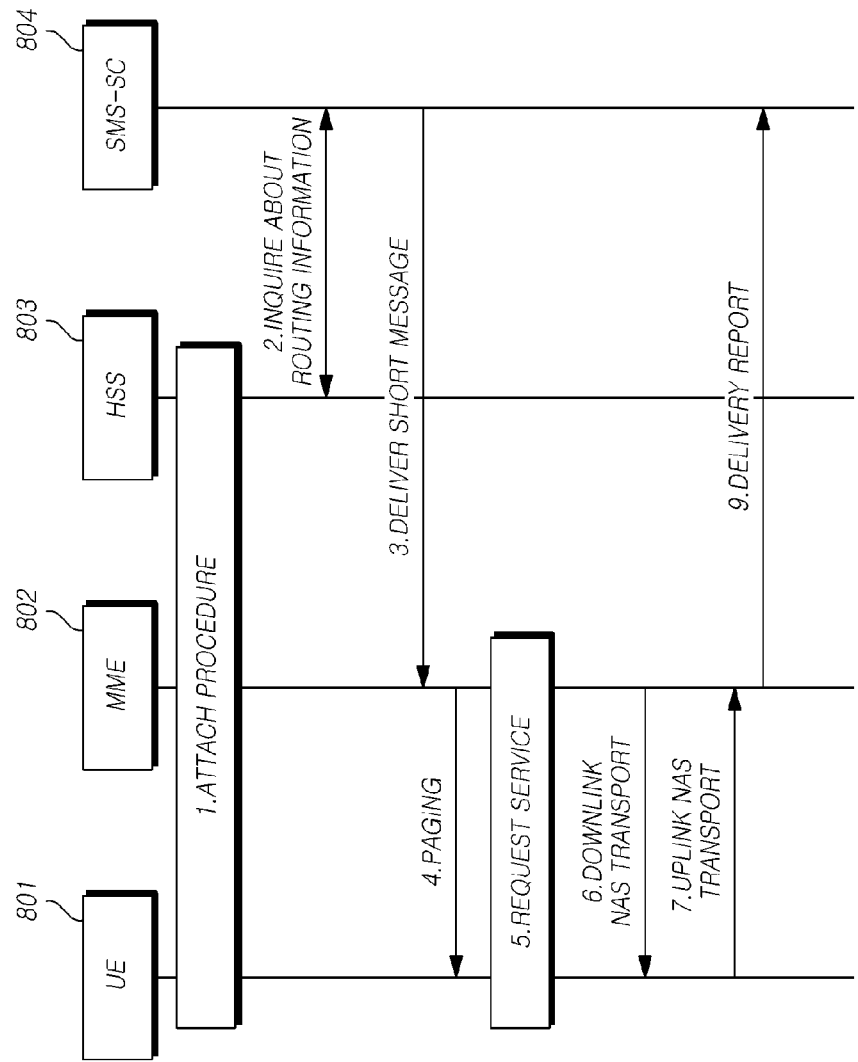
FIG. 8 is a flowchart illustrating delivery of an MT SMS service with respect to a PS-only subscription UE in an idle mode according to at least one embodiment of the present invention.

FIG. 8 is a flowchart illustrating an MT SMS service for a PS-only subscription UE in an idle mode according to at least one embodiment of the present invention. The MT SMS service of FIG. 8 may be used when an MME and an SMS-SC are directly connected (e.g. when an SMS-GMSC function is embodied in an SMS-SC).

1) A network attach procedure described in FIG. 4 is executed. Alternatively, a combined EPS/IMSI network attach procedure to which an SMS in MME function is applicable is executed.

2) An SMS-SC 804 inquires of an HSS (or an HLR) 803 about MME information on an MME providing a service to a UE. In this instance, if the SMS-SC already received the MME information, the SMS-SC may omit step 2.

3) SMS-SC 804 delivers an SMS message (i.e., RP-DATA/TPDU/SMS-DEUVERY) to the MME 802. In this instance, when a UE that receives the SMS uses an external identifier, as opposed to an MSISDN, the SMS-SC delivers the SMS message to an RP-Destination-Address (RP-DA) of Relay Layer Protocol-Mobile terminate (RP-MT-DATA), using an IMSI. Alternatively, the SMC-SC delivers the SMS message to an RP-Destination-Address (RP-DA) of Relay Layer Protocol-Mobile terminate (RP-MT-DATA), using an external identifier. Alternatively, the SMS-SC delivers the SMS message to an RP-Destination-Address (RP-DA) of Relay Layer Protocol-Mobile Terminate (RP-MT-DATA), using only a local identifier out of the external identifier. The external identifier is classified into a domain identifier under a control of a Mobile Network Operator (MNO) and a local identifier allocated by the MNO, and the local identifier may be used for obtaining an IMSI.

4) The MME 802 initiates a paging procedure.

5) The UE 801 transmits a service request message to the MME 802.

6) The MME 802 encapsulates an SMS message into an NAS message and transmits the same to the UE 801.

7) The UE 801 delivers a delivery report to the MME 802.

8) The MME 802 delivers the delivery report to the SMS-SC 804.

Figure 9:
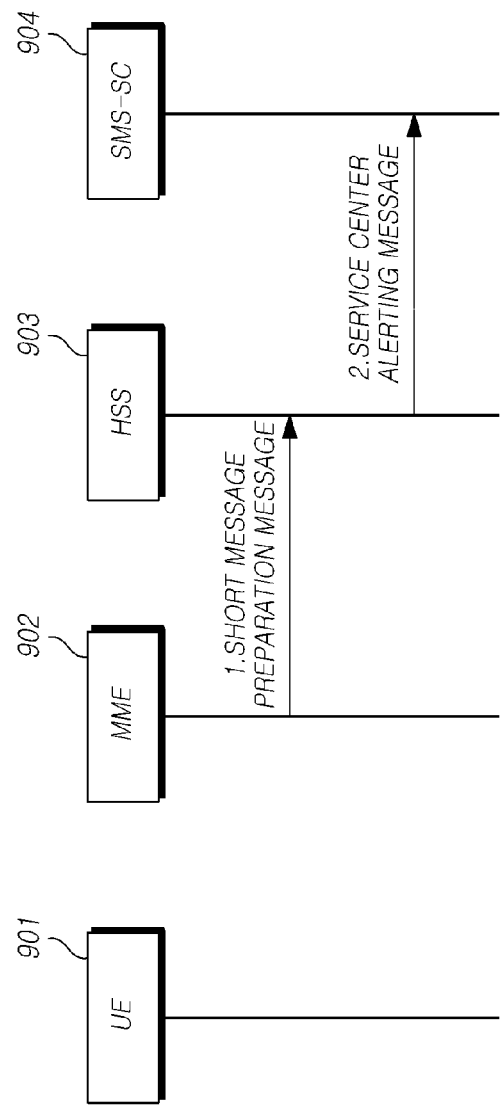
FIG. 9 is a flowchart illustrating SMS alerting of an MME according to at least one embodiment of the present invention.

FIG. 9 is a flowchart illustrating SMS alerting of an MME according to at least one embodiment of the present invention.

An MME may fail to deliver a short message to the UE due to an error caused when a UE is not registered (not attached) on an LTE mobile communication network, when the UE is out of a wireless coverage, or when the memory capacity of the UE is exceeded. In this instance, when the MME determines 'SMS in MME' to be provided as an SMS service delivery method for the UE, or when the UE indicates SMS-only and the MME determines 'SMS in MME' to be provided as an SMS service delivery method for the UE, the MME may notify that the UE is not reachable (e.g. UE Not Reachable for MME (UNRE) or Mobile Station Not Reachable Flag for MME (MNRF)). The MME may deliver UNRE and MNRF to an HSS based on a general incoming SMS procedure. When the UE is not reachable for the MME, the HSS includes the message (e.g., UNRE or MNRF) in message waiting indication (MWI) information indicating that a waiting message exists due to SMS delivery failure. The MWI information includes MSISDN-alert information. The MSISDN-alert refers to an MSISDN used when the HSS reports to the SMS-SC that the UE becomes reachable again. In this instance, when the UE, which corresponds to a PS-only subscription, uses an external identifier, as opposed to the MSISDN, IMSI may be used for the MWI information, instead of the MSISDN. Alternatively, an MT Correlation ID defined in TS 23.040 may be used for the MWI information, instead of the MSISDN. Alternatively, an external identifier or a local identifier in the external identifier may be used for the MWI information.

1) When the MME detects that the UE is reachable again after MME 902 is notified of that the UE 901 is not reachable, (e.g. because the UE responses to a paging request or the UE attempts attaching), the MME 902 transmits a Ready for SM message to the HSS 903 for reporting that a short message is ready to transmit and deletes the indication that the UE is not reachable. The Ready for SM message includes an IMSI which is an identifier for a UE and a cause of preparation for a short message (e.g., UE-Present).

2) The HSS 903 delivers alerting information to the SMS-SC 904. In this instance, when the UE, which corresponds to a PS-only subscription, uses an external identifier, as opposed to an MSISDN, an IMSI may be used for the alerting message, instead of the MSISDN. Alternatively, an MT correlation ID defined in TS 23.040 may be used for information indicating that a waiting message exists, instead of the MSISDN. Alternatively, an external identifier or a local identifier in the external identifier may be used for the information indicating that a waiting message exists.

Figure 10:
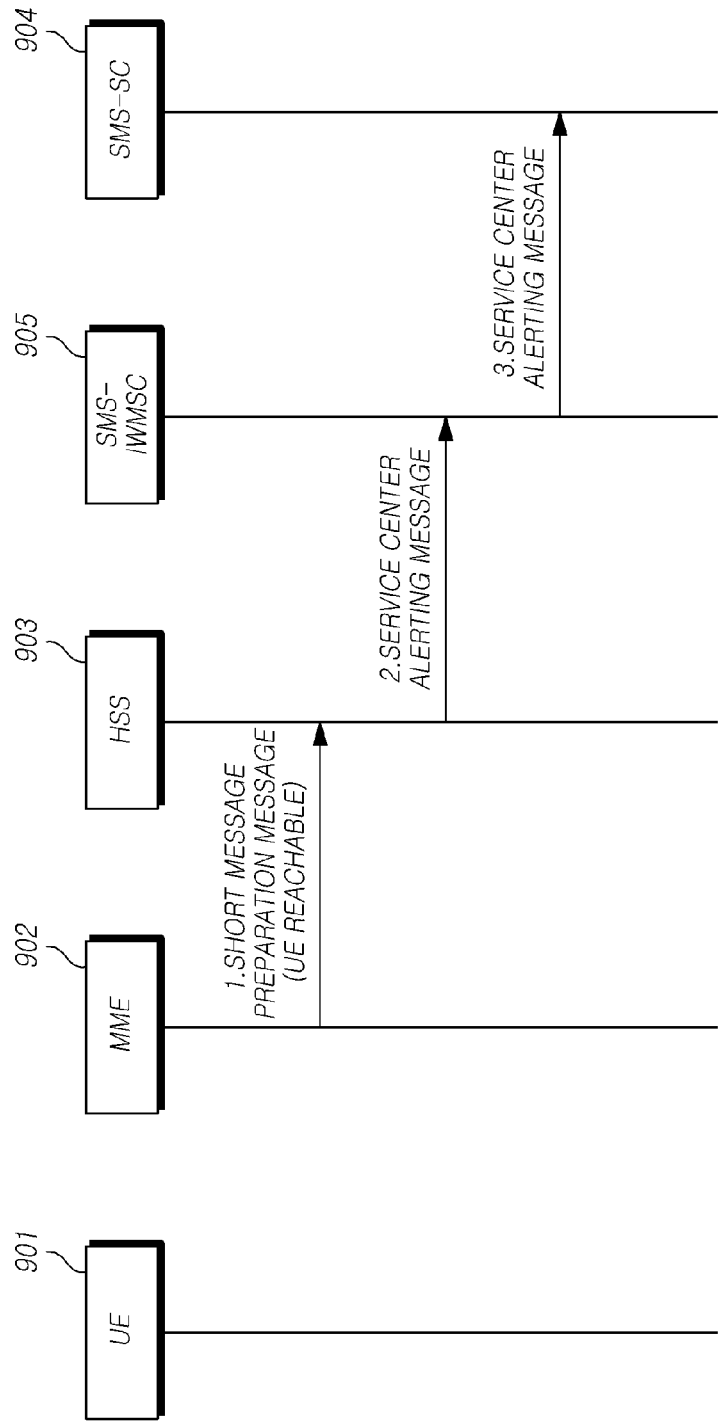
FIG. 10 is a flowchart illustrating SMS alerting of an MME when an SMS-IWMSC is used.

FIG. 10 illustrates an SMS alerting procedure of an MME when an SMS-IWMSC is used (e.g. when an SMS-IWMSC function is not embodied in an SMS-SC server).

1) It is identical to step 1 of FIG. 9.

2) The HSS 903 sends an alerting message (alertServiceCenter) to transmit alerting information to the SMS-IWMSC 905. In this instance, when the UE is a PS-only subscription and uses an external identifier, as opposed to an MSISDN, an IMSI may be used for the alerting message, instead of the MSISDN. Alternatively, an MT correlation ID defined in TS 23.040 may be used for information indicating that a waiting message exists, instead of the MSISDN. Alternatively, an external identifier or a local identifier in the external identifier may be used for the information indicating that a waiting message exists.

3) The SMS-IWMSC 905 sends an alerting message (ServiceCenteralert) to deliver alerting information to the SMS-SC 904. In this instance, when the UE is a PS-only subscription and uses an external identifier as opposed to an MSISDN, an IMSI may be used for the alerting message, instead of the MSISDN. Alternatively, an MT correlation ID defined in TS 23.040 may be used for information indicating that a waiting message exists, instead of the MSISDN. Alternatively, an external identifier or a local identifier out of the external identifier may be used for the information indicating that a waiting message exists.

Figure 11:
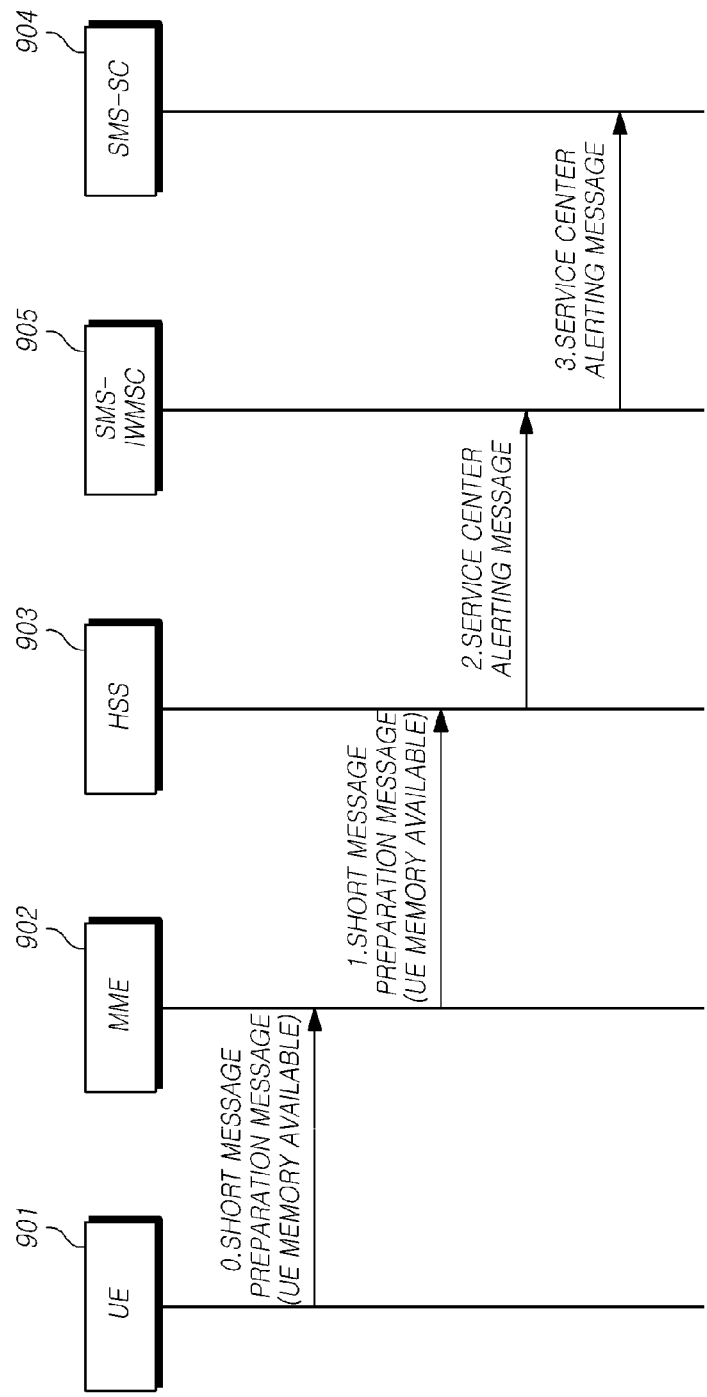
FIG. 11 is another example of the flowchart of SMS alerting of FIG. 9.

FIG. 11 is another example of the flowchart illustrating SMS alerting procedure of an MME of FIG. 9.

The MME may fail to deliver a short message to a UE due to an error caused when the memory capacity of the UE is exceeded. In this case (e.g., when the MME fails to deliver the short message because the memory capacity of the UE is exceeded) when the MME determines 'SMS in MME' to be provided as an SMS service delivery method for the UE, or when the UE indicates SMS-only and the MME determines 'SMS in MME' to be provided as an SMS service delivery method for the UE, the MME may deliver, to the HSS based on a general incoming SMS procedure, the information indicating that the MME fails to deliver the short message because the memory capacity of the UE is exceeded (e.g., User Equipment Memory Capacity Exceeded Flag (UCEF) or Mobile Station Memory Capacity Exceeded Flag (MCEF)). When the MME fails to deliver the short message because the memory capacity of the UE is exceeded, the HSS includes an indication indicating failure of short message delivery because the memory capacity of the UE is exceeded (e.g., User Equipment Memory Capacity Exceeded Flag (UCEF) or Mobile Station Memory Capacity Exceeded Flag (MCEF)), in information indicating that a waiting message exists due to failure of incoming SMS delivery. The MWI information indicating to the HSS that a waiting message exists includes MSISDN-alert information. In this instance, when the UE corresponds to a PS-only subscription and uses an external identifier as opposed to an MSISDN, an IMSI may be used for the information indicating that a waiting message exists, instead of the MSISDN. Alternatively, instead of the MSISDN, an MT Correlation ID defined in TS 23.040 may be used for information indicating that a waiting message exists. Alternatively, an external identifier or a local identifier out of the external identifier may be used for information indicating that a waiting message exists.

0) When a memory of the UE becomes available, the UE 901 reports to the MME 902 that the memory of the UE becomes available.

1) When the MME is reported that the memory of the UE becomes available, the MME 902 transmits, to the HSS 903, a Ready for SM message for reporting that a short message is ready to transmit. The Ready for SM message includes an IMSI which is an identifier for a UE and a cause of preparation for a short message (e.g. UE-memory-available).

2) The HSS 903 send an alerting message (alertServiceCenter) to transmit alerting information to the SMS-IWMSC 905. In this instance, when the UE corresponds to a PS-only subscription and uses an external identifier as opposed to an MSISDN, an IMSI may be used for the alerting message, instead of the MSISDN. Alternatively, an MT correlation ID defined in TS 23.040 may be used for information indicating that a waiting message exists, instead of the MSISDN. Alternatively, an external identifier or a local identifier out of the external identifier may be used for the information indicating that a waiting message exists.

3) The SMS-IWMSC 905 sends an alerting message (ServiceCenteralert) to deliver alerting information to the SMS-SC 904. In this instance, when the UE corresponds to a PS-only subscription and uses an external identifier as opposed to an MSISDN, an IMSI may be used for the alerting message, instead of the MSISDN. Alternatively, an MT correlation ID defined in TS 23.040 may be used for information indicating that a waiting message exists, instead of the MSISDN. Alternatively, an external identifier or a local identifier out of the external identifier may be used for the information indicating that a waiting message exists.

Figure 12:
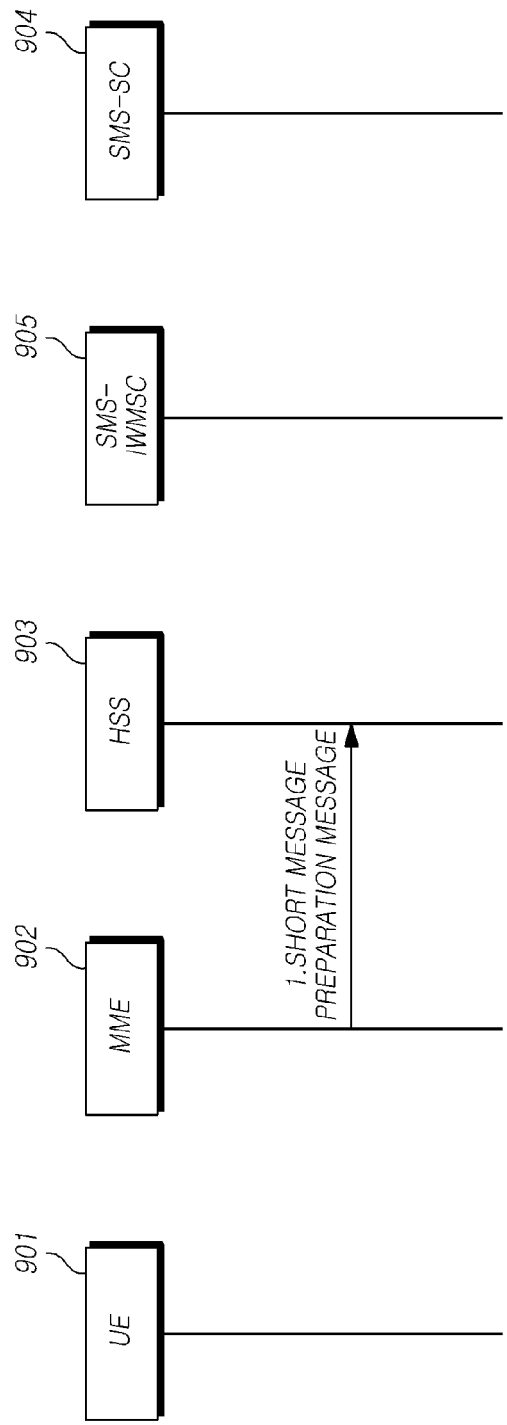
FIG. 12 is another example of the flowchart of SMS alerting of FIG. 9.

FIG. 12 is another example of the flowchart illustrating SMS alerting of an MME of FIG. 9.

1) When the MME detects that the UE is reachable again after MME is notified of that a UE is not reachable, (e.g. because a UE response to a paging request or attempts attaching), the MME 902 transmits, to the HSS 903, a short message preparation (Ready for SM) message for reporting that a short message is ready to transmit, and deletes the indication that the UE is not reachable. The short message preparation message includes an IMSI which is an identifier for a UE and a cause of preparation for a short message (e.g., UE-Present).

When message waiting indication (MWI) information indicating that a waiting message exists due to the failure of incoming SMS delivery includes one of a User Equipment Memory Capacity Exceeded Flag (UCEF) and a Mobile Station Memory Capacity Exceeded Flag (MCEF), which indicate the short message delivery failure because the memory capacity of the UE is exceeded, the alerting procedure may be terminated at this step.

Figure 13:
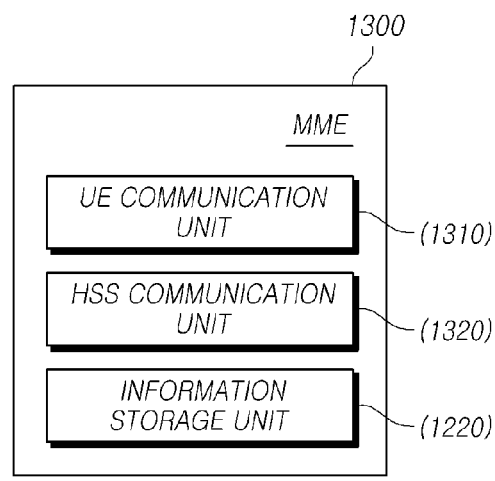
FIG. 13 is a block diagram illustrating a configuration of an MME according to at least one embodiment of the present invention.

FIG. 13 is a block diagram illustrating an MME according to an embodiment of the present invention.

Referring to FIG. 13, an MME 1300 may include a UE communication unit 1310 for communication with a UE, an HSS communication unit 1320 for communication with an HSS, and information storage unit 1220 for storing information associated with a UE.

When a short message to be delivered to a UE exists, the UE communication unit 1310 delivers the short message to the UE.

When message delivery to the UE fails due to reasons caused by the UE, such as, when the UE is not registered on a mobile communication network, when the UE is out of a wireless coverage, or when the memory capacity of the UE is exceeded, the HSS communication unit 1320 delivers, to the HSS, information indicating that a waiting message exists, including information (for example, the UNRE or MNRF) indicating that the UE is not reachable for the MME 1300, and the information storage unit 1220 may store information indicating that the UE is not reachable (for example, the UNRE or the MNRF). The information indicating that a waiting message exists, may include an MSISDN, an IMSI, or external identifier information.

Upon the detection of the UE becoming reachable after the UE was indicated as unreachable in the information storage unit 1220, the HSS communication unit 1320 delivers, to the HSS, a short message preparation (Read for SM) message for reporting that the MME 1300 is ready for the short message, and the information storage unit 1220 may delete the information indicating that the UE is not reachable. The short message preparation message may include an identifier of the UE and a cause of preparation for a short message. The HSS receives the short message preparation message from the MME 1300 and may deliver alerting information to an SMS-SC. The SMS-SC executes a short message delivery procedure.

Figure 14:
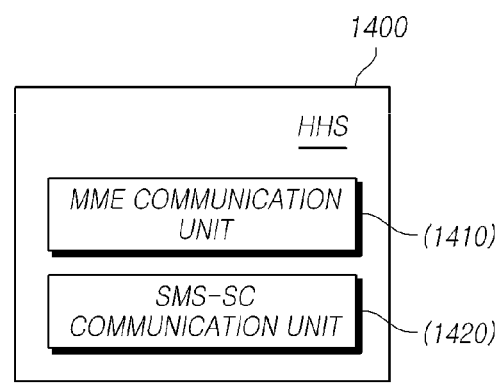
FIG. 14 is a block diagram illustrating a configuration of an HSS according to at least one embodiment of the present invention.

FIG. 14 is a block diagram illustrating an MME according to an embodiment of the present invention.

Referring to FIG. 14, an HSS 1400 may include an MME communication unit 1410 for communication with an MME and an SMS-SC communication unit 1420 for communication with an SMS-SC.

The MME communication unit 1410 may receive information (for example, the MWI) indicating that a waiting message exists, including information (for example, the UNRE or the MNRF) indicating that a UE receiving a short message from the MME is not reachable. Alternatively, after receiving the information indicating that the waiting message exists, the MME communication unit 1410 receives a short message preparation (Ready for SM) message from the MME.

When the short message preparation message is received after receiving the information indicating that a waiting message exists, the SMS-SC communication unit 1420 may deliver alerting information to the SMS-SC. The SMS-SC receives the information and may execute a short message delivery procedure.

Figure 15:
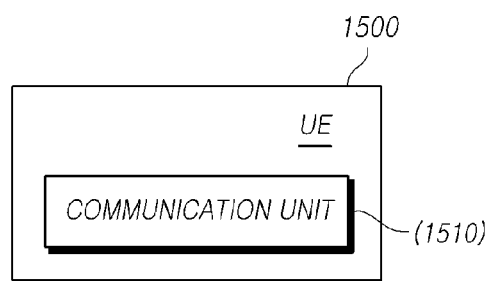
FIG. 15 is a block diagram illustrating a configuration of a UE according to at least one embodiment of the present invention.

FIG. 15 is a block diagram illustrating a UE according to an embodiment of the present invention.

Referring to FIG. 15, a UE 1500 may include a communication unit 1510.

The communication unit 1510 may communicate with an MME, so as to execute an EPS network attach procedure, as illustrated in FIG. 4 through FIG. 8.

The communication unit 1510 fails to receive a message for the UE 1500 due to various causes such as when the UE is not registered on a mobile communication network, when the UE is out of a wireless coverage, or when a memory capacity of the UE is exceeded, and the like. When such causes are eliminated, the communication unit 1510 may receive a message from an SMS-SC. In this instance, an HSS is notified of that the UE fails to receive a message through the MME, and the HSS is also notified of the elimination of the failure causes through the MME. Then, the SMS-SC is notified by the HSS.

Although the embodiments of the present invention have been described for illustrative purposes, those skilled in the art will appreciate that various modifications, additions and substitutions are possible, without departing from the scope and spirit of the invention. Therefore, exemplary aspects of the present disclosure have not been described for limiting purposes. The scope of the present invention shall be construed on the basis of the accompanying claims in such a manner that all of the technical ideas included within the scope equivalent to the claims belong to the present invention.

The invention claimed is:

1. A short message delivery method, executed by a Mobility Management Entity (MME) in a mobile communication network that provides a Packet Switching (PS)-only service, the method comprising:
- transmitting, by the MME, information indicating that a short message service (SMS) function is supported by the MME, to a subscriber information server, to register the MME as a serving node for an incoming SMS service when the MME is configured to support the SMS function;
- performing, by the MME, a delivery of a short message to a User Equipment (UE); and
- delivering, by the MME, information indicating that the UE is not reachable, to the subscriber information server when the delivery of the short message to the UE fails.

2. The method of claim 1, wherein, when the delivery of the short message to the UE fails, the method further comprises:
- setting, in the MME, an indication indicating that the UE is not reachable.

3. The method of claim 1, wherein, upon detection of that the UE becomes reachable after the delivery of the short message to the UE fails, the method further comprises:
- delivering, to the subscriber information server, information indicating that a short message is ready.

4. The method of claim 1, wherein the short message service (SMS) function is an "SMS in MME" function.

5. A short message delivery method, executed by a subscriber information server in a mobile communication network that provides a Packet Switching (PS)-only service, the method comprising:
- receiving, from a Mobility Management Entity (MME), information indicating that a short message service (SMS) function is supported by the MME;
- registering the MME as a serving node for an incoming SMS service;
- receiving, from the MME, information indicating that a User Equipment (UE) to receive a short message is not reachable and receiving, from the MME, a preparation message for transmission of the short message; and
- delivering a service center alerting message to a short message server.

6. The method of claim 5, wherein the service center alerting message includes a Mobile Station International Subscriber Directory Number (MSISDN) of the UE, an International Mobile Subscriber Identity (IMSI), or an external identifier.

7. The method of claim 5, wherein, when the information from the MME indicates that the UE to receive the short message is not reachable, the method further comprises:
- updating waiting message information.

8. The method of claim 7, wherein the waiting message information includes a Mobile Station International Subscriber Directory Number (MSISDN) of the UE, an International Mobile Subscriber Identity (IMSI), or an external identifier.

9. The method of claim 5, wherein the short message service (SMS) function is an "SMS in MME" function.

10. A Mobility Management Entity (MME) in a mobile communication network that provides a Packet Switching (PS)-only service, the MME comprising:
- a User Equipment (UE) communication unit configured to perform a delivery of a short message to a User Equipment (UE); and
- a subscriber information server communication unit configured (i) to transmit, to a subscriber information server, information indicating that a short message service (SMS) function is supported by the MME, to register the MME as a serving node for an incoming SMS service when the MME is configured to support the SMS function, and (ii) to deliver, to the subscriber information server, information indicating that the UE is not reachable when the delivery of the short message to the UE fails.

11. The MME of claim 10, further comprising:
- an information storage unit configured to indicate that the UE is not reachable when the delivery of the short message to the UE fails.

12. The MME of claim 10, wherein the subscriber information server communication unit delivers, to the subscriber information server, a preparation message for transmission of a short message upon detection that the UE becomes reachable after the delivery of the short message to the UE fails.

13. The MME of claim 10, wherein the short message service (SMS) function is an "SMS in MME" function.

* * * * *